Dec. 15, 1959   B. VONNEGUT   2,916,773
GLASS FIBERIZATION METHOD

Filed Jan. 12, 1955   2 Sheets-Sheet 1

INVENTOR.
BERNARD VONNEGUT
BY
ATTORNEYS

Dec. 15, 1959     B. VONNEGUT     2,916,773
GLASS FIBERIZATION METHOD
Filed Jan. 12, 1955     2 Sheets-Sheet 2
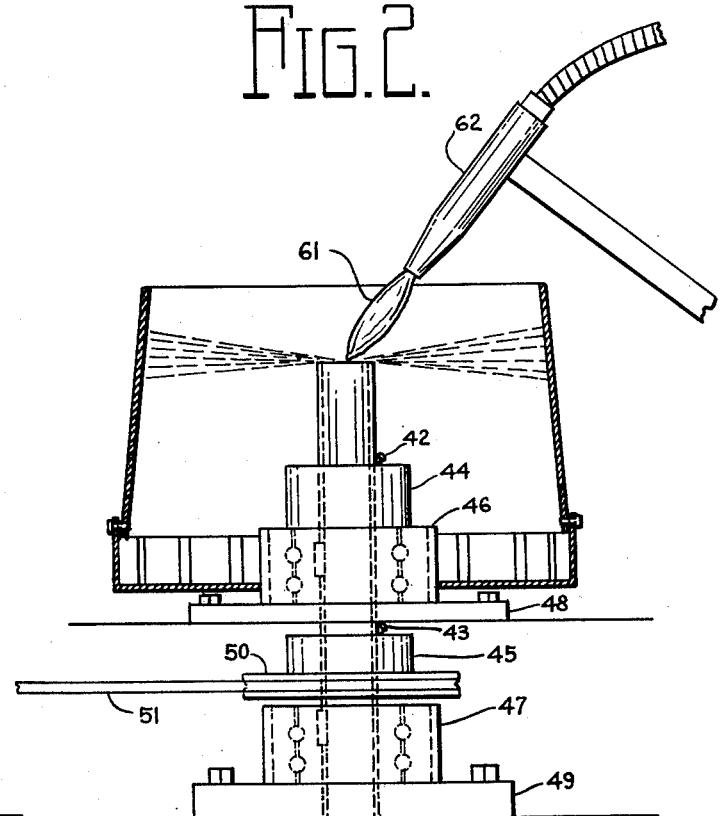
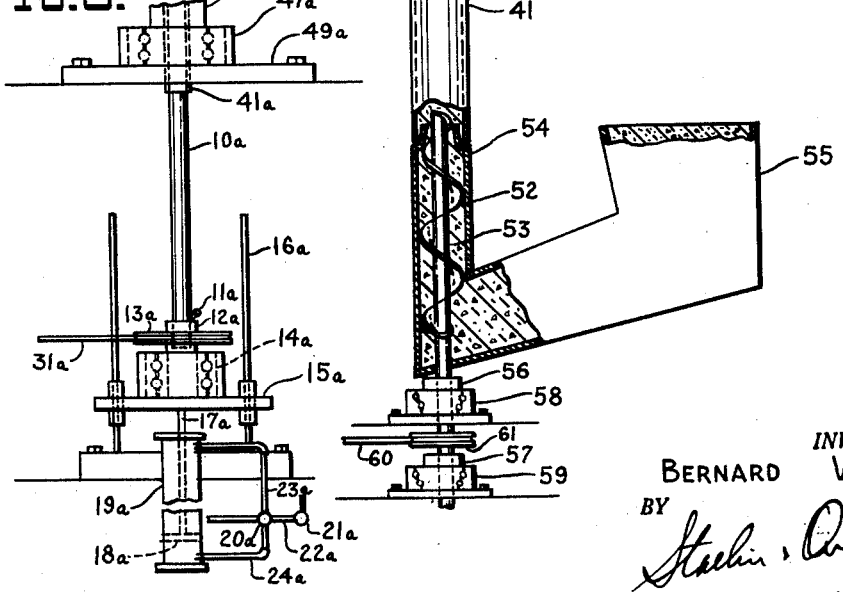
INVENTOR.
BERNARD VONNEGUT
BY
ATTORNEYS

United States Patent Office 2,916,773
Patented Dec. 15, 1959

2,916,773
GLASS FIBERIZATION METHOD

Bernard Vonnegut, North Scituate, Mass., assignor to Owens-Corning Fiberglas Corporation, a corporation of Delaware Application January 12, 1955, Serial No. 481,330

8 Claims. (Cl. 18—47.2)

This invention relates to a glass fiberization method wherein glass is formed into a rod, and a localized portion thereof is heated above its softening temperature while rotating the rod at a high rate of speed so that immediately upon softening, the glass is thrown outwardly in fibers by the centrifugal force resulting from the high speed rotation.

Various techniques have heretofore been suggested for fiberizing glass. Most such techniques have required the formation of a body of molten glass, the flowing of streams from the body of molten glass and attenuation of the streams in some manner. Such attenuation is usually accomplished, in comercial practice, by rapidly accelerating the molten stream, for example with a blast of a gas, such as compressed air, steam, or combustion products. It has also been suggested that centrifugal force can be used to effect such acceleration, for example by applying the streams of molten glass to a rotating plate so that centrifugal force throws off and attenuates the streams.

In commercial practice streams of molten glass are formed by allowing discharge thereof from the bottom of a melting tank through "bushings," usually platinum or platinum alloy inserts provided with orifices and positioned in the bottom of a melting tank. Any of the above-described previously known attenuation processes which requires the formation of streams of molten glass is limited by the thermal properties of the bushing material to the fiberization of glasses of relatively low softening temperature. Ordinarily, such bushings cannot be operated when the molten glass is maintained at a temperature above about 2600° F., preferably, not above 2400° F. As a consequence, it is impractical to fiberize by such methods glasses having a softening temperature higher than about 2600° F.

The present invention is based upon the discovery of a novel fiberization method which eliminates the need for a large body of molten glass, eliminates the need for bushings, and therefore can be used to fiberize high melting glasses.

It is, therefore, an object of the invention to provide a novel method for fiberizing glass or other fusible material.

It is a further object of the invention to provide a method for fiberizing materials having a devitrification temperature above the practical operating temperature of platinum or platinum alloy bushings.

It is still another object of the invention to provide a method for forming glass fibers wherein a glass rod is rotated at a high rate while a localized portion thereof is heated above its softening temperature.

Other objects and advantages will be apparent from the description which follows, reference being had to the accompanying drawings in which—

Fig. 2 is a view similar to Fig. 1 but of apparatus for carrying out a modification of the method of the invention; and Fig. 3 is a fragmentary, vertical, sectional view of a section of apparatus for performing a further modified method of the invention.

Figure 1:
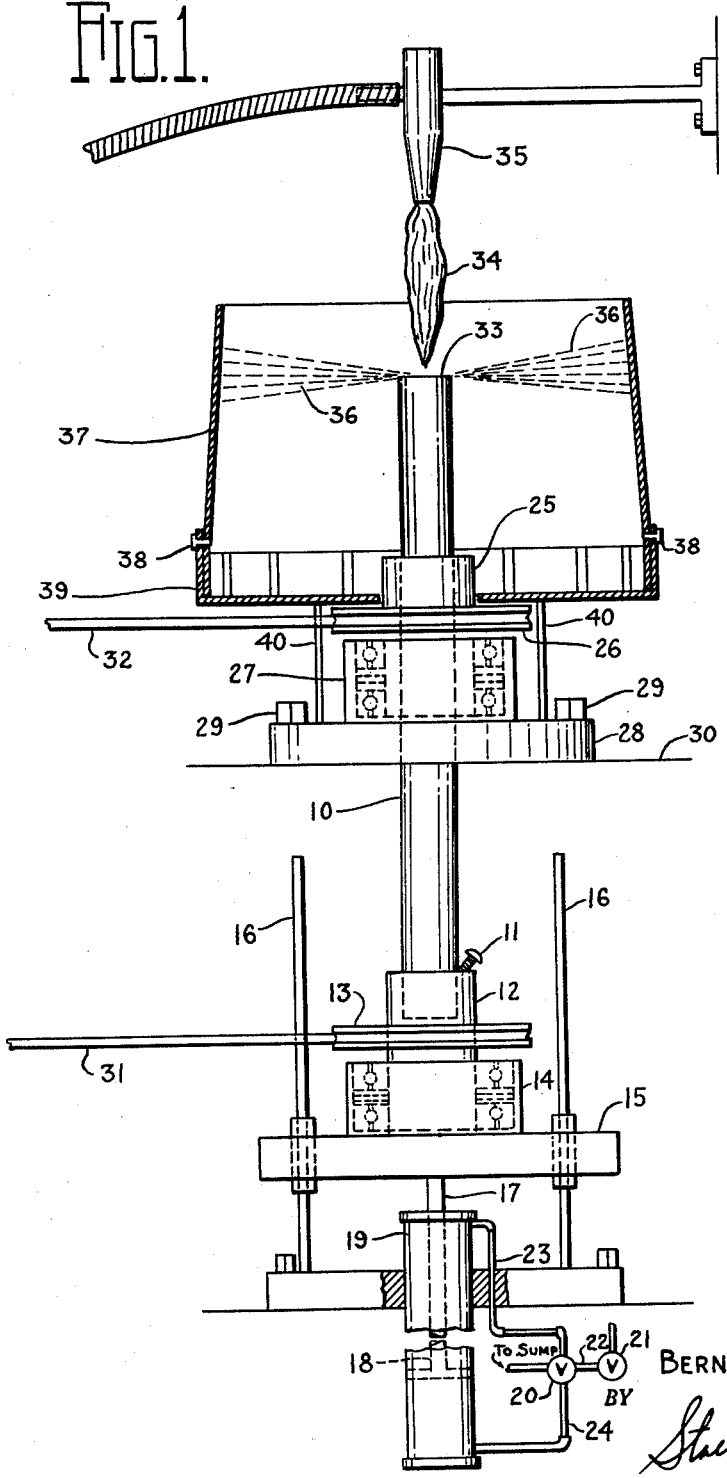
Fig. 1 is a view in vertical section of apparatus for carrying out the method of the invention.

According to the invention a novel method for forming fibers from a fusible material is provided. The method of the invention comprises rotating about its longitudinal axis a rod-like mass of a fusible material to be fiberized, while heating an end of the rod-like mass to a temperature above the softening temperature of the material. The rate of rotation of the mass is sufficiently high that the softened material is thrown off centrifugally in fiber forming streams.

Apparatus for practicing an embodiment of the invention as shown in Fig. 1 includes a glass rod 10 locked by a set screw 11 in a socket 12. A pulley 13 is keyed or otherwise rigidly attached to the socket 12, which is journalled for rotation in a bearing 14. The bearing 14 is mounted on a platen 15 carried by guides 16, and supported for limited vertical movement by a ram 17 which is attached to a piston 18 in an actuating cylinder 19.

In the specific structure shown the ram 17 is raised or lowered by hydraulic fluid under pressure admitted to a valve 20 from a source (not illustrated), through a needle valve 21 and a line 22. Hydraulic fluid passes from the line 22 through a line 23, to the portion of the cylinder 19 above the piston 18, or through a line 24 to the portion below the piston 18, depending upon the setting of the valve 20. The valve 21 acts as a throttling valve to regulate the rate of movement of the piston 18, ram 17, and platen 15. When the valve 20 is set in a third position, hydraulic fluid is prevented from flowing through either the line 23 or the line 24, so that the piston 18 and the ram 17 are locked in place.

The upper portion of the glass rod 10 is supported by a collar 25, to which a pulley 26 is keyed or otherwise rigidly attached. The collar 25 is journaled for rotation in a bearing 27, which is in turn mounted on a platen 28 attached, as by retainers 29, to a rigid frame member 30. The glass rod 10 is not clamped in the collar 25, but is free to move longitudinally with respect thereto.

In operation, any suitable power source (not illustrated) drives belts 31 and 32 which engage, respectively, the pulleys 13 and 26, and drive the socket 12 and collar 25 at substantially the same number of revolutions per minute. The glass rod 10 is rotated by the socket 12, and is supported by the collar 25, stresses on the rod being minimized during such rotation by virtue of the rotation at the same rate of the collar 25. The upper end surface 33 of the rod 10 is positioned by appropriate control of the valve 20, as described, so that it is heated by a flame 34 from a burner 35, to a temperature above the softening temperature of the rod material at which the viscosity and surface tension of the material are suitable for fiberization. Centrifugal force caused by rotation of the rod throws the softened material from the surface 33 thereof, and causes the formation of fibers 36. Attenuation of the fibers 36 occurs partially from centrifugal force and partially from the drag of the air or combustion products against the fibers as the rotation of the rod tends to drag them therethrough.

It has been observed in practice that there is no build up of material at the center of the upper surface of the rod 10. It is believed that withdrawal of such material is aided by cohesive forces and surface tension of the melt as centrifugal force is not exerted therein. Gravity would also aid such withdrawal by virtue of hydrostatic head which would develop if molten material tended to accumulate at the center of this surface.

The fibers 36 are thrown against a foraminous frusto-conical collector 37 which is attached for example by bayonet latches 38 to a lower frame member 39 mounted on supports 40 which are attached in any suitable manner to the platen 28. The fibers 36 adhere to the foraminous collector 37, so that the fiberization process can be continued until a desired quantity of fibers has been collected on the internal surface of the collector 37, for example a quantity sufficient for a particular package. The collector 37 can then be removed from the apparatus and a new collector installed.

Structure for practicing a modification of the invention is shown in Fig. 2. A metal, ceramic, or other refractory tube 41 is locked by set screws 42 and 43 in collars 44 and 45, which are journalled for rotation in bearings 46 and 47 carried by plates 48 and 49. A pulley 50 is keyed or otherwise rigidly attached to the collar 45, and driven by a power source (not illustrated) through a belt 51.

Granular or powdered fusible material to be fiberized, which can be, for example, glass or glass batch material, is delivered to the lower extremity of the tube 41 by a screw feed 52 operating on a shaft 53 in a housing 54 which communicates with a hopper 55. The shaft 53 is keyed or otherwise attached to sleeves 56 and 57, which are journalled for rotation in thrust bearings 58 and 59. The shaft 53 is rotated by any suitable power source (not illustrated) through a belt 60 which drives a pulley 61 keyed or otherwise attached to the shaft.

In operation of the apparatus of Fig. 2 the tube 41 is rotated, for example, at about 10,000 revolutions per minute, while the granular or powdered fusible material to be fiberized is fed through the interior thereof at approximately the rate that material at the upper end of the tube is fiberized by a flame 61 from a burner 62, as described.

In the apparatus for practicing the invention as shown in Fig. 3, a glass rod 10a is supported and moved longitudinally as shown in Fig. 1 being locked by a set screw 11a in a socket 12a. A pulley 13a is keyed or otherwise rigidly attached to the socket 12a, which is journalled for rotation in a bearing 14a. The bearing 14a is mounted on a platen 15a carried by guides 16a, and supported for limited vertical movement by a ram 17a which is attached to a piston 18a and an actuating cylinder 19a.

The ram 17a is raised or lowered by hydraulic fluid under pressure admitted to a valve 20a from a source (not illustrated), through a needle valve 21a and a line 22a. Hydraulic fluid passes from the line 22a through a line 23a to the portion of the cylinder 19a above the piston 18a, or through a line 24a to the portion below the piston 18a, depending upon the setting of the valve 20a. The valve 21a acts as a throttling valve, as described.

The upper end of the glass rod 10a passes through a metal, ceramic or other refractory tube 41a. The supporting and driving mechanism for the tube 41a is not fully illustrated, being identical with that shown in Fig. 2 for the tube 41. The tube 41a is locked by set screws in collars, which are journalled for rotation in bearings carried by plates. A pulley is keyed or otherwise rigidly attached to one of the collars, and driven by a power source (not illustrated) through a belt.

In operation of the apparatus of Fig. 3 the tube 41a, is rotated, for example, at about 10,000 revolutions per minute, while the rod 10a is rotated at approximately the same rate and fed by gradual upward movement of the platen 15a through the interior of the tube 41a at approximately the rate that material at the upper end of the tube is fiberized by a flame from a burner, as described and shown in Figs. 1 and 2.

*Example*

A Pyrex glass rod having a length of three inches and a diameter of ⅛ inch was clamped in a vertical position in a bearing assembly and rotated at about 18,000 revolutions per minute. The composition of the glass was as follows:

| | Percent |
|---|---|
| $SiO_2$ | 81.0 |
| $Al_2O_3$ | 2.0 |
| $B_2O_3$ | 12.0 |
| $Na_2O$ | 4.5 |

The terms "percent" and "parts" are used herein to refer to percent and parts by weight unless otherwise indicated.

While the glass rod was rotating its upper end surface was heated in an oxy-hydrogen flame to a temperature sufficiently high to cause the glass to soften at the surface. As portions of the glass softened they were thrown from the rod and attenuated into fine fibers, which were accumulated on the inner surface of a foraminous basket-like collector.

In addition to Pyrex glass, the following materials have also been fiberized by the procedure described above: A vitreous calcium aluminum silicate commercially available under the designation "Fiber Frax," kaolin sintered into rod form, a high softening point glass (approximately 1500° C.) containing about 96 percent of $SiO_2$, a small amount of $B_2O_3$ and traces of $Al_2O_3$, $Na_2O$, $Fe_2O_3$ and $As_2O_5$, and various high lead glasses.

The sintered kaolin was essentially crystalline, so that the heating was above the liquidus temperature to melt the material before fiberization.

Other materials that could be fiberized by the foregoing procedure include glasses in general, and fusible compositions that can be quenched to glasses.

It has been found that a rod should be rotated at at least 10,000 revolutions per minute, preferably at least 12,000, for fiberization according to the method of the invention. So far as fiberization is concerned, there is no upper limit on rate of rotation of the rod-like mass, but, as a practical matter, speeds higher than about 30,000 revolutions per minute are unreasonably difficult to achieve. An end of the rod must be heated above the softening temperature so that the heated material has the viscosity and surface tension requisite for fiberization. Such temperature can be above the liquidus as in the case of the kaolin rod identified above or below as is the case of other materials.

It will be apparent that various changes and modifications can be made from the specific details of the method of the invention discussed herein. For example, the upper portion of the rod (above the collar 25) might be preheated, as by direct burners, radiant heating members, or in any other desired manner, in order to increase the fiberization rate. Other means for advancing the rod to keep its upper surface in contact with the flame can also be employed, or the rod might be maintained stationary while the burner, collector, and support collar 25 are progressively lowered. Instead of a frusto-conical collector, a plurality of continuous foraminous belts could be used to surround the fiberization zone and collect the fibers. The collector can be oscillated longitudinally of the rod being fiberized to increase the size of fiber package produced, or to control the pattern thereof. Various other changes and modifications can be made from the specific details shown and discussed without departing from the spirit of the attached claims.

I claim:

1. A method for forming fibers from a solid fusible material which comprises rotating a mass of the solid fusible material while heating an end thereof to a temperature in excess of the softening temperature of the material, the rate of rotation of the mass being sufficiently high that the softened material is thrown off centrifugally in fiber forming streams.

2. A method for forming fibers from a solid fusible material which comprises rotating a mass of the solid fusible material while heating an exposed surface thereof to a temperature in excess of the softening temperature of the material, the rate of rotation of the mass being sufficiently high that the softened material is thrown off centrifugally in fiber forming streams.

3. A method according to claim 2 and advancing the mass to continuously expose additional surface thereof at a rate sufficient to supply new material as material is fiberized therefrom.

4. A method for forming fibers from a solid fusible material which comprises rotating a mass of compacted, particulate, fusible material while heating an exposed surface thereof to a temperature in excess of the softening temperature of the material, the rate of rotation of the mass being sufficiently high that the softened material is thrown off centrifugally in fiber forming streams.

5. A method for forming glass fibers which comprises rotating a glass mass while heating an exposed surface thereof to a temperature in excess of the softening temperature of the material, the rate of rotation of the glass mass being sufficiently high that the softened material is thrown off centrifugally in fiber forming streams.

6. A method for forming glass fibers which comprises rotating an elongated rod-like mass of glass while heating an end thereof to a temperature in excess of the softening temperature of the glass, the rate of rotation of the glass mass being sufficiently high that the softened material is thrown off centrifugally in fiber forming streams.

7. A method for forming fibers which comprises rotating a glass rod while heating an end thereof to a temperature in excess of the softening temperature of the glass, the rate of rotation of the glass rod being sufficiently high that the softened material is thrown off centrifugally in fiber forming streams, and advancing the end of the rod longitudinally concomitantly with its rotation at a rate sufficient to supply new material as material is fiberized therefrom.

8. A method for forming fibers from a solid fusible material which comprises rotating a solid sintered rod of the fusible material while heating an end thereof to a temperature in excess of the softening temperature of the material, the rate of rotation of the rod being sufficiently high that the softened material is thrown off centrifugally in fiber forming streams.

References Cited in the file of this patent

UNITED STATES PATENTS

| | | |
|---|---|---|
| 2,189,387 | Wissler | Feb. 6, 1940 |
| 2,234,521 | Dietzel | Mar. 11, 1941 |
| 2,294,588 | Pazsiezky | Sept. 1, 1942 |